United States Patent [19]
Herzberg et al.

[11] Patent Number: 5,625,692
[45] Date of Patent: Apr. 29, 1997

[54] METHOD AND SYSTEM FOR A PUBLIC KEY CRYPTOSYSTEM HAVING PROACTIVE, ROBUST, AND RECOVERABLE DISTRIBUTED THRESHOLD SECRET SHARING

[75] Inventors: Amir Herzberg, Bronx, N.Y.; Stanislaw M. Jarecki, Cambridge, Mass.; Hugo M. Krawczyk, Riverdale; Marcel M. Yung, New York, both of N.Y.

[73] Assignee: International Business Machines Corporation, Armonk, N.Y.

[21] Appl. No.: 376,580

[22] Filed: Jan. 23, 1995

[51] Int. Cl.$^6$ .................................................. H04L 9/00
[52] U.S. Cl. ................................. 380/21; 380/30; 380/49
[58] Field of Search .......................... 380/49, 30, 21, 380/25, 59, 44

[56] References Cited

U.S. PATENT DOCUMENTS

| | | | |
|---|---|---|---|
| 4,578,531 | 3/1986 | Everhart et al. | 380/21 |
| 4,876,716 | 10/1989 | Okamoto | 380/21 |
| 5,175,765 | 12/1992 | Perlman | 380/30 |
| 5,202,921 | 4/1993 | Herzberg et al. | 380/23 |
| 5,220,606 | 6/1993 | Greenberg | 380/43 |
| 5,375,170 | 12/1994 | Shamir | 380/30 |
| 5,412,723 | 5/1995 | Canetti et al. | 380/21 |
| 5,469,507 | 11/1995 | Canetti et al. | 380/30 |
| 5,491,750 | 2/1996 | Bellare et al. | 380/21 |

OTHER PUBLICATIONS

"Safeguarding Cryptographic Keys," AFIP Con. Proc. (V. 48), 1979 pp. 313–317.
"How to Share a Secret", Commun ACM, 22, 1979, pp. 612–613.
Crypto '94, "Maintaining Security in the Presence of Transient Faults", Weizmann Institute, 1994.
"How to Withstand Mobile Virus Attacks," Proc. of the 10th ACM Symposium on the Principles in Distributed Computing, 1991, pp. 51–61.
"A Practical Scheme for Non–Interactive Verifiable Secret Sharing," Proc. of the 28tgh IEEE Symposium on the Foundations of Computer Science, pp. 427–437, 1987.
"Distributed Provers with Applications to Undeniable Signatures," Eurocrypto '91, 1991.

*Primary Examiner*—Thomas H. Tarcza
*Assistant Examiner*—Pinchus M. Laufer
*Attorney, Agent, or Firm*—Jenkens & Gilchrist; Douglas W. Cameron

[57] ABSTRACT

A proactive threshold secret sharing cryptosystem using a set of servers. The cryptosystem is a threshold cryptosystem, in the sense that service is maintained if at least (k+1) out of n servers are active and honest. The secret signature key is compromised only if the adversary breaks into at least (k+1) servers. It is robust in the sense that the honest servers detect faulty ones and the service is not disrupted. It is recoverable, because if the adversary erases all the local information on the server it compromised, the information can be restored as soon as the server comes back to performing the correct protocol. The method and system has proactiveness, which means that in order to learn the secret, the adversary has to break into (k+1) servers during the same round of the algorithm because the shares of the secret are periodically redistributed and rerandomized. The present invention uses a verifiable secret sharing mechanism to get the security requirements during the update between two rounds. The security of the scheme depends on the assumption of intractability of computing logarithms in a field of a big prime order and the ElGamal signature scheme.

16 Claims, 6 Drawing Sheets

METHOD AND SYSTEM FOR A PUBLIC KEY CRYPTOSYSTEM HAVING PROACTIVE, ROBUST, AND RECOVERABLE DISTRIBUTED THRESHOLD SECRET SHARING

TECHNICAL FIELD OF THE INVENTION

The present invention relates to data processing systems and more particularly to data processing systems including cryptographic mechanisms for information security.

BACKGROUND OF THE INVENTION

Public key encryption systems are used to send and receive encrypted messages. Public key encryption systems are those in which a message is encrypted by performing a mathematical algorithm using a publicly available value, called the public key. Then, the recipient decrypts the message by performing an algorithm using a private value, called the private key. Public key encryption depends on choosing an encryption algorithm, E, and a decryption algorithm, D, such that deriving D, even given a complete description of E, would be effectively impossible. The three requirements of public key encryption are:

1. D(E(P))=P, wherein P is the message;
2. It is exceedingly difficult to deduce D from E; and
3. E cannot be broken by attacking P.

Thus, the public key can be distributed freely. The private key, however, must be kept private by the entity that uses it. If an intruder accesses the memory content of the entity, the system security is broken. This holds true for all the original public key patents. In Key escrow systems and Micali's fair cryptosystems, the private key is split into many portions and each portion is held by a different entity. However, if with passing time an intruder is able to read each entity's memory, system security is broken.

PROACTIVE SECRET SHARING

To explain the concept of proactive secret sharing, the terminology of secret sharing schemes and their security characteristics must be explained.

Threshold, Robustness and Recoverability in Secret Sharing

Secret sharing was first introduced by G.R. Blakley, Safeguarding Cryptographic Keys, AFIPS Con. Proc. (v. 48), 1979, pp. 313–317 and A. Shamir, How to Share a Secret, Commun. ACM, 22, 1979, pp. 612–613. In its most basic form, secret sharing is a way to divide a secret piece of information M among n participants, called share holders, so that together they will be able to reconstruct it. However, no group of (n−1) share holders can learn anything about M. This mechanism is used to increase security whenever there is a need to safeguard a piece of information. The increase in security corresponds to being able to guard the secret from an adversary who can break into some servers, but not all of them.

Every secret sharing scheme has these conceptual phases:

(1) a dealing phase, when a dealer who knows the secret creates its shares and distributes them among the share holders;

(2) a storage phase, when the shares are maintained by the share holders; and (3) a reconstruction phase, when the share holders reconstruct the secret from their shares.

The basic secret sharing described above is not very practical because if an adversary compromises a share holder and erases or modifies the secret share held by that holder, the secret M can never be reconstructed. Hence, the above scheme is secure against an adversary who can break into (n−1) servers and learn their shares, but cannot erase or modify servers' memories or storage, cannot cause any server to crash and does not interfere either with the dealing of the shares or with the reconstruction of the secret.

Before the properties of secret sharing that make the basic scheme more secure are defined, the different types of attacks on servers by an adversary must be defined. These attacks are defined as follows:

- A server is compromised to the adversary if she breaks into it and learns all the secret information stored at this server: its secret share and keys used for communication.

- The adversary freezes a server if she causes it to stop working. It is assumed, however, that as soon as the adversary is purged, the server can return to performing the correct protocol (i.e., no data is lost). Cutting the server's access to the network is an example of freezing a server. Shutting off the power or killing all the processes on the server also constitute freezing, if all the necessary data (variables and the algorithm code) is not erased or modified. A frozen server does not send or receive any messages; it is idle until human intervention brings it up again.

- The adversary controls a server if she can change the protocol it performs and cause it to send messages that are incorrect with respect to the original protocol. From the other server's point of view, such a server is cheating or dishonest. Freezing is a trivial case of controlling.

- The adversary disables a server when she manages to erase or modify the secret data that the server stores. Erasing the protocol code or erasing public keys of other servers makes it harder for the system management to bring this server back to life, but since this information is public, it can be reinstalled into the server without exposing any secret information to the system operators. It is the destruction of server's secret share that makes a qualitative difference between freezing and disabling.

The desirable properties of secret sharing schemes, which offer security against the above types of adversaries, are described below. The concern is with security during the storage and reconstruction phases while leaving the dealing phase as insecure as in the basic secret-sharing scheme described above. This concern can be contrasted with verifiable secret sharing schemes, which aim at increasing security during the dealing phase.

A secret sharing scheme is called a threshold scheme if only (k+1) out of n servers need to cooperate to reconstruct the secret. This property makes the system secure against attackers who:

- During the reconstruction phase freeze or disable up to N−(k+1) out of n servers. During the storage phase, the adversary can freeze more servers, and the threshold scheme will still be secure, provided that these servers are brought up before the reconstruction phase starts.

- During the lifetime of the algorithm compromise k out of n servers. Compromising (k+1) out of n servers allows the adversary to reconstruct the secret by herself.

The above two requirements can be met only if the threshold k is a strict minority, i.e., when 2k+1<n.

A secret sharing scheme is called robust if the reconstruction phase is secure in the presence of up to k cheating servers. The threshold scheme by itself relies on the fact that when the attacker can disable or freeze, but cannot control the compromised servers, then there is no problem in picking the group of (k+1) non-faulty servers to reconstruct the secret, because faulty means non-active. In short, robustness makes the threshold scheme secure against adversaries who during the reconstruction phase can disable or control no more than k servers in total.

A threshold secret sharing scheme is recoverable if the proper secret share can be restored to the server that lost it. This scheme assumes that a loss can happen during the storage phase only. Thus, the recovery mechanism will be carried out during the storage phase. The property of recovery in secret sharing is the object of the present invention. It makes the robust threshold scheme secure against adversaries who can disable or control no more than k out of n servers at any time during the storage phase. Whenever the system notices that some servers are disabled, the recovery phase starts and it will be successful assuming that it is so short that the adversary will not compromise other servers during this phase.

Recovery is needed whenever the secret share is lost. But that can happen with or without the adversary learning this secret share. The share might be lost because an adversary with compromising and disabling capabilities broke into a server, learned its secret share and erased or modified it. But the share might be lost due to a power outage. One could argue that in the first case, the secret could just as well be restored publicly since the adversary knows it anyway. However, there might be more than one adversary, in which case, public recovery of a share spares the other adversaries some work. Also, since a mechanism to deal with the case of disability due to the power outage exists, it can be used in the case when one of the adversaries knows the secret. It is hard to know which case the security scheme is dealing with, so it is better to use one secure recovery mechanism whenever a secret share is lost.

Secret Recovery and Server Authentication

If the adversary has the capability of erasing or modifying the local storage and memory of the compromised server, and she can also inject messages to the communication channels between the servers, a fully automatic recovery is impossible. A human being must reboot the server, start up the process performing the secret-sharing algorithm and reinstall some means of mutual authentication between this server and the others.

The issue of server authentication is rarely discussed in connection to secret sharing. However, server authentication is necessary to preserve the security of the recovery protocol in the presence of an adversary who can send messages to the servers from outside the group of servers that participate in secret sharing. The recovering server A must have some means of authenticating the servers B that try to reinstall its share. Also, the servers B must be sure that it is indeed A to whom they are giving the proper share. These goals can be reached with either secure links between A and Bs or with pairs of secret/public decryption and signature keys between A and servers in B. However, if the server A lost its secret share, it could also lose all its other secret keys used for securing and authenticating its links with the other servers B. This means that human intervention in reinstalling means of authentication to a disabled server is necessary for recovery. This intervention will either consist of installing new server-to-server link security between A and servers B, or in reinstalling B's public authentication/encryption keys on A, letting A compute its new private keys and securely installing them on servers B. In the example of a proactive system, private/public keys are used for server to server communication, and hence the human intervention in the recovery mechanism will be of the second type.

Proactiveness

A new property of secret sharing schemes must be defined: proactiveness. Proactiveness increases security by restricting the rate with which the adversary can compromise servers. The storage phase of the proactive secret sharing scheme is composed of rounds divided by short update phases. The scheme is secure against the adversary who can compromise no more than k servers during the same round. Without proactiveness, the scheme is secure against the adversary who can compromise up to k during the whole storage phase, i.e., effectively during the lifetime of the algorithm. A proactive scheme is secure against the adversary who compromises all of the servers, provided she does not do it too quickly. This property is achieved by a re-randomization of the secret shares held by the servers during the update phases. The update protocol is equivalent to re-dealing the secret without revealing it in the process. Formally, the update must achieve the following:

1. No group of k or fewer servers participating in the update protocol can learn anything about the new shares of other servers.

2. Knowing k out of n previous shares and k out of n new shares does not reveal any information about the secret share.

Proactiveness Versus Threshold, Robustness and Recovery

An adversary during the update phase protocol should be no stronger than during the reconstruction phase. Therefore, to proactivize a robust, recoverable threshold secret sharing scheme, the update phase must be secure against the adversary who can disable or control up to k servers.

Proactiveness and recoverability in secret sharing make the most sense when they are used together. Notice that without a recovery mechanism, the proactive secret sharing increases security against some types of attack but decreases it against others. Non-proactive secret sharing schemes are secure against adversaries who can control servers during the storage phase, simply because the servers do not do anything during that phase. During the storage phase in a proactive scheme, servers periodically update their shares. Therefore, if a server is frozen or controlled during an update phase it will not have a proper share in the next round, which is equivalent to the case of the adversary with disabling capabilities. Hence, a proactive scheme is secure against an attacker who can control up to k servers in one round only if it has a recovery mechanism. Also it is secure against an attacker who can control or disable up to k servers in one round.

SUMMARY OF THE INVENTION

It is an object of the present invention to provide a method of and system having a proactive, robust and recoverable distributed threshold secret sharing scheme.

It is another object of the present invention to provide a proactively secure key certification authority using the above scheme.

The foregoing and other objects are achieved by a method and system which provides a proactive threshold secret sharing cryptosystem using a set of servers. The proactive secret sharing cryptosystem is a distributed threshold cryptosystem, in the sense that service is maintained if at least (k+1) out of n servers are active and honest. The secret signature key is compromised only if the adversary breaks into at least (k+1) servers. It is robust in the sense that the honest servers detect faulty ones and the service is not disrupted, even when the servers infiltrated by the adversary are cheating. It is recoverable, because if the adversary erases all the local information on the server it compromised, the information can be restored as soon as the server comes back to performing the correct protocol. The method and system has proactiveness, which means that in order to learn the secret, the adversary has to break to (k+1) servers during the same round of the algorithm because the shares of the secret are periodically redistributed and rerandomized. The present invention uses a verifiable secret sharing mechanism to get the security requirements during the update between two rounds. The present invention assumes that the servers are communicating through a broadcast medium, that they have fully synchronized, unbreakable local clocks and that they have local sources of true randomness. The security of the scheme depends on the assumption of intractability of computing logarithms in a field of a big prime order. It also depends on the security of the ElGamal signature scheme, which is used for server-to-server authentication.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION THE PREFERRED EMBODIMENT OF THE INVENTION

The present invention is a proactive threshold secret sharing scheme with properties of robustness and recoverability. Disclosed are the model and goals of this scheme and the tools that it uses. Also disclosed is a Key Certification Authority system using the present invention. The security of the scheme depends on the assumption of intractability of computing logarithms in a field of a big prime order. It also depends on the security of the ElGamal signature scheme, which is used for server-to-server authentication. For an example of an ElGamal signature scheme which may be used in the present invention see T. ElGamal, A Public Key Cryptosystem and a Signature Scheme Based on Discrete Logarithm, IEEE Trans. on Informational Theory 31, p. 465, 1985.

Model of the System and Assumptions About the Adversary

Assume a system of n servers A={$P_1, P_2, \ldots, P_n$} that will proactively secret-share value x. Also, assume that the system is securely and properly initialized. The goal of the scheme is to prevent an adversary from learning x. At the same time, the adversary cannot prevent servers A from reconstructing x themselves when they need to. Given are specifications about servers A and the communication network they communicate with. Also specified are the interaction mechanisms between the servers A and the human management as well as the trust held by the management.

Model of Proactive Servers

Figure 1:
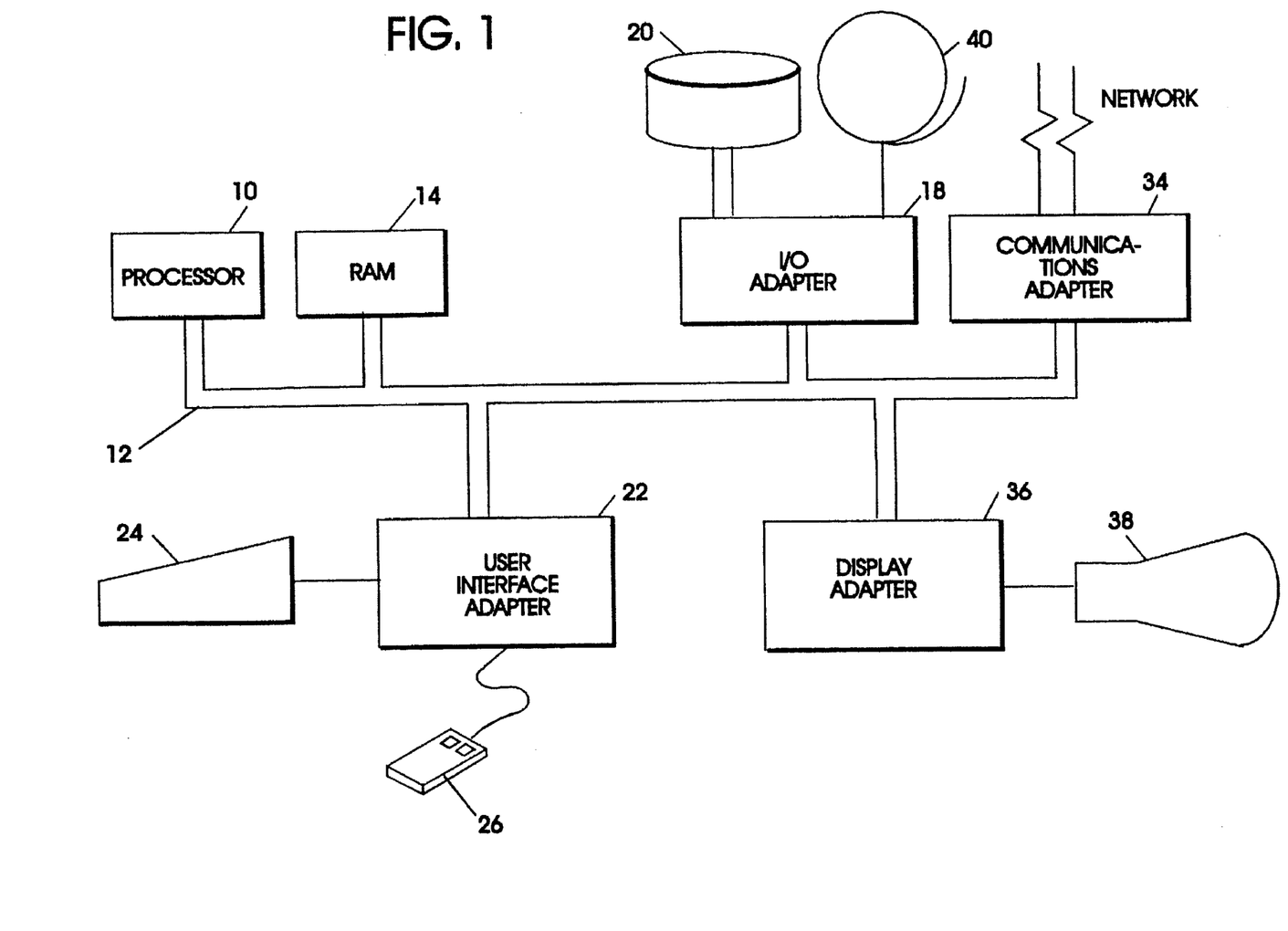
FIG. 1 is a diagram of a server console.

A representative hardware configuration of a server for practicing the present invention is depicted in FIG. 1, which illustrates a typical hardware configuration of a workstation in accordance with the subject invention having central processing unit 10, such as a conventional microprocessor, and a number of other units interconnected via system bus 12. The workstation shown in FIG. 1 includes random access memory (RAM) 14, input/output (I/O) adapter 18 for connecting peripheral devices such as disk units 20 and tape drives 40 to bus 12, user interface adapter 22 for connecting keyboard 24, mouse 26, speaker 28, and/or other user interface devices such as a Microphone (not shown) or a touch screen device (not shown) to bus 12, communication adapter 34 for connecting the workstation to a communications network, and display adapter 36 for connecting bus 12 to display device 38. Although not shown, the workstation shown in FIG. 1 may also include read only memory (ROM).

Figure 2:
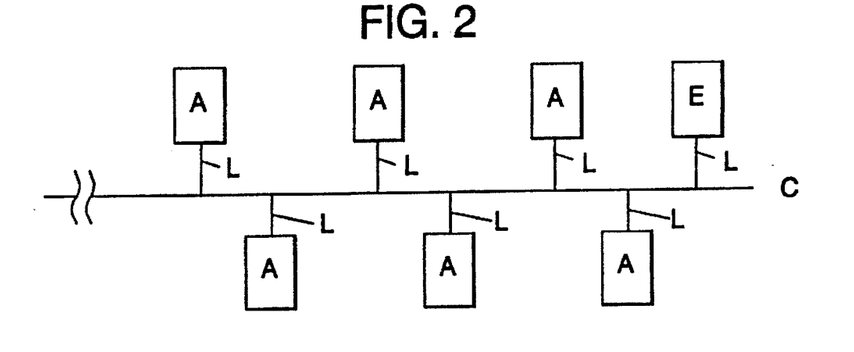
FIG. 2 is a block diagram showing servers connecting to a communications channel.

FIG. 2 shows how servers A are connected via private links L to a common broadcast medium C, called the communication channel or communication network, which also connects them to the outside world. The broadcast medium has the property that whenever a message is sent to it from a link connecting it to some server, it instantly reaches all the other links connected to this medium. The present invention assumes the servers in A are equipped with secure and synchronized clocks (not shown), which do not change or fail even when the adversary controls or disables a server. These clocks divide the time between rounds and update phases. Because of synchronization, every server in A gets the signal to start the update phase at the same time. Also assumed is that every server in A has a source of true randomness (not shown). If the adversary compromises a server, she cannot predict the future random numbers generated on that server. Every server also has a figurative unbreakable box that contains a code with the algorithm described below for every server (not shown).

Adversary

The adversary's model of attacks on the servers A is an extension of a "mobile fault" model. For an example of a "mobile fault" model, see R. Ostrovsky & M. Yung, How to Withstand Mobile Virus Attacks, Proc. of the 10th ACM Symposium on the Principles in Distributed Computing, 1991, pp. 51–61 and R. Canetti & A. Herzberg, Crypto 94. Let $k_1^{(t)}$ be the number of servers in A the adversary corrupts at any point during round t, and let $k_2^{(t)}$ be the number of additional servers whose links to the communication channel are under active attack by the adversary at any point during the round t. Then, our proactive secret-sharing scheme is secure against the adversary for whom $(k_1^{(t)}+k_2^{(t)} \leq k)$ for every round t. To achieve this bound we need $n \geq 2k+2$ servers in A.

The scheme can easily be made secure against stronger adversaries. First, it is possible to achieve the same bound k on adversaries in the round with one less server, i.e., $2k+1 \leq n$. Second, with changes to the synchronization mechanism, more attacks on the links can be allowed, because all such attacks are always detected by the system and the servers could halt the protocol until the management removes the adversary from the link.

Corrupting a server means any of the following:

Compromising it: Learning all the data it stores.

Controlling it: Making it faulty with respect to the specified protocol. This includes freezing the machine.

Disabling it: Modifying (or erasing) its data.

Additionally, the adversary always knows the data classified as public and it knows the algorithm M that each machine performs. For simplicity, the present invention treats "natural" power outages, data loss and other hardware failures as actions of the adversary. Therefore, every time a machine is faulty, assume that it is the adversary that corrupted it.

When a server is corrupted at any point during the update phase between two rounds, the server is corrupted for both of these rounds. The reason behind this way of counting corrupted servers is that it is impossible or at least very hard to differentiate between an adversary who moves from one server to another during the update phase and the adversary who just stays in both all throughout. This differentiation is not a realistic concern in this setting, where update phase is negligibly short when compared to the length of one round. Furthermore, the present invention treats the adversary who jumps from one server to another in the same way as if both of them are corrupted throughout the round.

Apart from attacking servers in A, the adversary can attack the communication network between them. Assume the adversary has its own server E that is connected via its link to the same communication channel C that connects servers A. Therefore, it can both listen to messages broadcasted on C and broadcast messages to C. However, when a message reaches the communication channel, the adversary cannot prevent it from reaching all the links connected to it. The adversary can also make an attack on the link connecting some server in A with the communication channel. If a link to server P∈A is under such attack, the adversary can block it both ways: it can prevent P from hearing the messages that are broadcasted on C as well as it can stop the messages sent by P broadcasted on C. Formally, the adversary can see all the tapes of both links L and the communication channel C. Replacing the algorithm of some link L with adversary's algorithm constitutes an active attack on that link while tampering with the algorithm of C is forbidden in this model.

The present invention assumes that the adversary attacking the servers A and the links L is "removable", i.e., it can be removed when it is detected. However, server E is not "removable", it cannot be traced or cut from C.

Assumptions About the Human Management of the System

Every server in A has display device 38 through which it can display information to the human management. Using Keyboard 24, or other user interface devices, the managers can reboot the server and perform a procedure for renewal of the authentication keys. A program allows for entering data to the server. The management is trusted in the following ways: they will not tamper with the servers and they won't cheat in the protocol specified for them. In other words, the management is trusted to follow instructions on when and how to reboot a server and perform the reinstallation of authentication keys.

The human management is responsible for tracing down the adversary attacking on the links. Assume that whenever the management is instructed to check whether the link is under attack and remove the potential attacker, the procedure is always successful. Also assume that all the procedures of rebooting servers, reinstalling public authentication keys and removing adversaries from the links take less time then the length of a round.

The Secret Sharing Scheme

Figure 3:
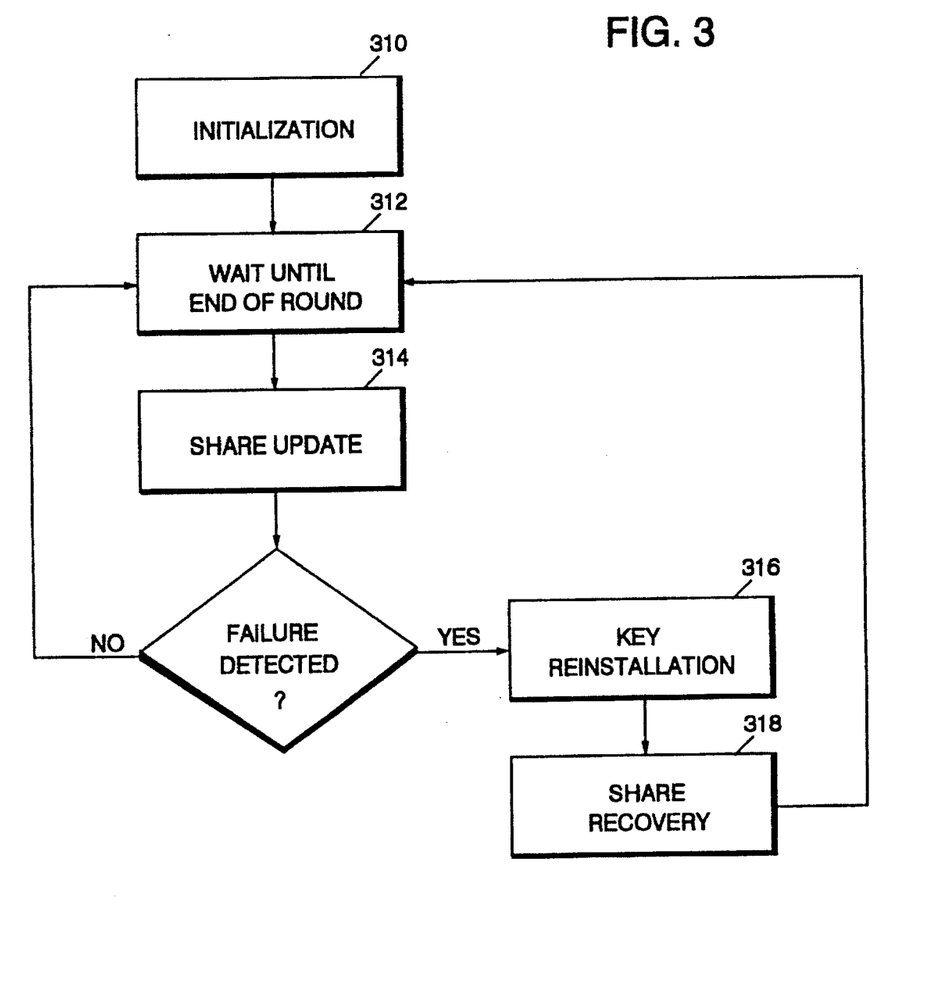
FIG. 3 is a flow chart showing a high-level view of the sequence of steps of a preferred embodiment of the present invention.
Figure 4:
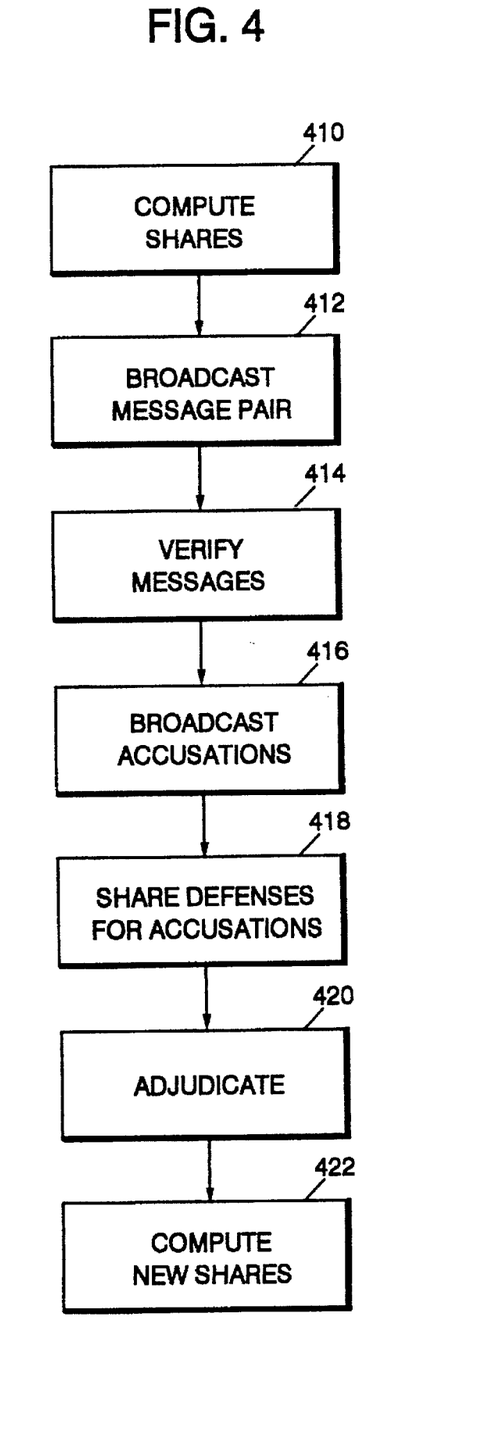
FIG. 4 is a flow chart showing the sequence of steps of a preferred embodiment of the share update protocol of the present invention.
Figure 5:
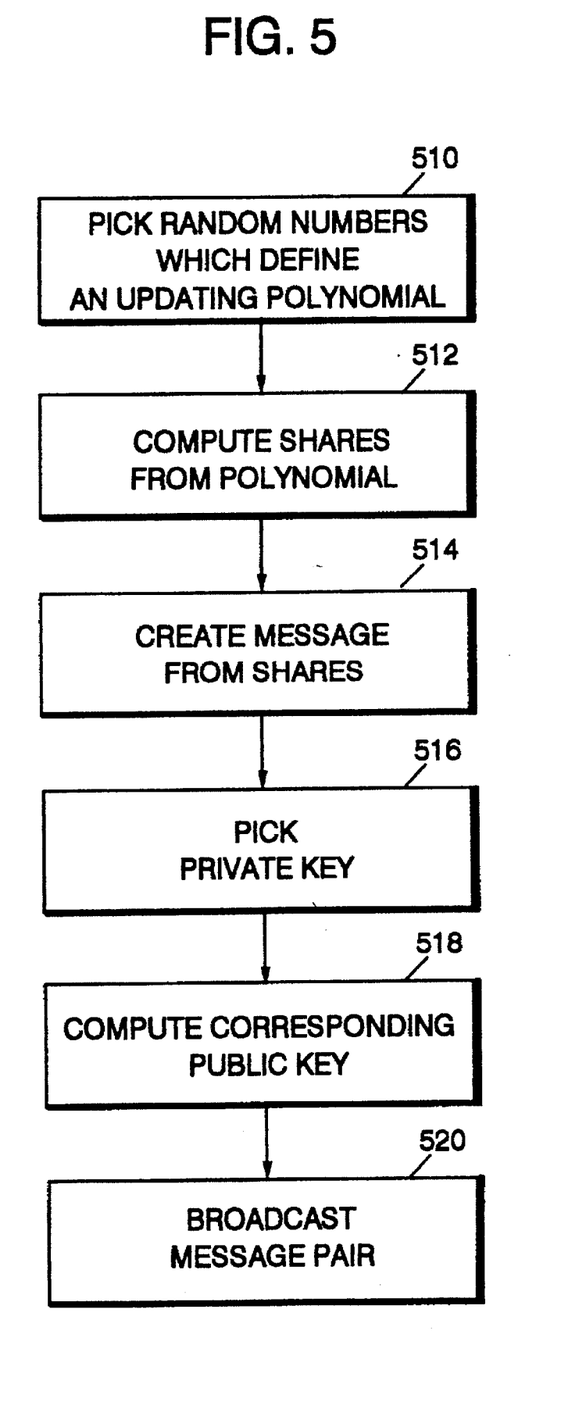
FIG. 5 is a flow chart showing the sequence of steps in step 410 of FIG. 4.

A preferred method of the proactive verifiable secret sharing scheme of the present invention is shown by the flow chart of FIG. 3. FIG. 4 is a detailed flow chart of step 314 in FIG. 3. Similarly, FIG. 5 is a detailed flow chart of step 410 in FIG. 4.

Initialization

Step 310 is to initialize the servers. Let p be a prime number such that p=mq+1, where q is also prime and m is a small integer like 2, 3 or 4. Let g be an element of $Z_p$ of order q, i.e., $g^q=1$ (mod p). The prime p is chosen to be secure for the ElGamal encryption and signature schemes. The secret value x belongs to $Z_q$. Use a modification of Shamir's secret sharing over a finite field $Z_q$ as the threshold secret sharing scheme: There exists a (k+1) degree polynomial f in $Z_q$, such that f(0)=x (mod q) and every server $P_i$, i ∈{1, n} has its secret shared $x_i^{(1)}$=f(i) (mod q). The index (1) denotes that these will be the values used in the first round.

Additionally, each server $P_i$ has its private authentication and encryption key $w_i$, a random number in $Z_q$. The set of public counterparts to these keys $\{r_i^{(1)}\}_{i\in\{1,n\}}$ where (mod p) $r_i^{(1)}=g^{w_i(1)}$ public and stored by every server in A. Additionally, every server needs a set of one-way hashes of all $x_i$'s for robustness in reconstruction of the secret. The present invention uses exponentiation as a one-way hash, and so every server stores a set $\{y_i^{(1)}\}_{i\in\{1,n\}}$, where $y_i^{(1)}=g^{x_i(1)}$ (mod p).

As mentioned in the description of the model, the present invention assumes that the adversary is not present in any way (passively or actively) during the initialization stage. Consequently, this initialization can be done openly.

After the initialization, local clocks of servers in A start ticking. At this point, the operation of the servers is synchronized into discrete time periods or rounds (step 312). At the end of each round, an update phase is triggered (step 314). In the update phase servers A perform an update protocol and then there is a reserved time for management to perform optional (up to k of them) key reinstallation procedures followed by share reconstruction protocols. The update phase is long enough to encompass all of these, but it is assumed to be short in comparison to a round.

Update Protocol

To update the shares, as shown by step 314 and FIG. 4, the present invention adapts a simplified version of the update protocol presented in R. Ostrovsky & M. Yung. When the secret x is stored as a value f(0)=x of a k degree polynomial f in $Z_q$, it can be updated by adding it to a k degree random polynomial δ(.), where δ(0)=0, so that $f^{(t+1)}(0)=f^{(t)}(0)+\delta(0)$ =x+0=x. Ostrovsky and Yung noticed that the linearity of the operation of computing a polynomial at a point allows for a very simple update of the shares $x_i$=f(i), namely: $f^{(t+1)}\delta(.)\leftarrow f^{(t)}(.)+\delta(.)$ (mod q) ↔ $\forall_i f^{(t+1)}(i)=f^{(t)}(i)+\delta(i)$ (mod q) In the present system, δ(.)=(f_1(.)+f_2(.)+ . . . +f_n(.)) (mod q), each polynomial $f_i(.)$, $f_i(0)=0$,i ∈{1,n} of degree (k+1) is picked independently and at random by the ith server. The update protocol for each server $P_i$, i ∈{1,n} is as follows:

1. $P_i$ picks (k+1) random numbers $\{f_{ij}\}j\in\{1, (k+1)\}$ from $Z_q$. These numbers define a polynomial $f_i(z)=f_{i1}Z^1+f_{i2}Z^2+ . . . +f_{i(k+1)}Z^{k+1}$ in $Z_q$, whose free coefficient is zero and hence, $f_i(0)=0$.

2. For all other servers, $P_j$, $P_i$ sends $f_i(j)$ (mod q) to $P_j$. $P_i$ computes its new share $x_i^{(t+1)}\leftarrow x_i^{(t)}+(f_1(i)+f_2(i)+ . . . +f_n(i))$ (mod q) and erases all the variables it used except its current secret key $x_i^{(t+1)}$.

To make this protocol secure against the adversary with controlling capabilities, the present invention uses the mechanism of verifiable secret sharing using one-way functions presented by P.

For one such example of a variable secret sharing scheme which may be used in the present invention, see Feldman, A Practical Scheme for Non-Interactive Verifiable Secret Sharing, Proc. of the 28th IEEE Symposium on the Foundations of Computer Science, pp. 427–37, 1987 and then discussed by T. P. Pedersen, Distributed Provers with Applications to Undeniable Signature, Eurocrypto '91, 1991, which are both hereby incorporated by reference. This particular verifiable secret sharing scheme is used because it is non-interactive, and its side effect is that it allows for update of the secret's exponents $y_i$ together with updating $x_i$'s.

The honest servers should unanimously mark their shares of updating polynomial $f_i$ produced by server $P_i$ as "bad" in the following two cases:

1. If the shares $f_i(j)$ that $P_j$'s receive are not values of any polynomial of degree (k+1), or they are, but this polynomial $f_i$ is not a correct update polynomial because $f_i(0) \neq 0$.
2. If shares $\{g^{f_i(j)}\}_{j \in \{1,n\}}$, used for updating public values $y_j$ do not correspond to the secret update shares $\{f_i(j)\}_{j \in \{1,n\}}$ of $f_i$.

The values $w_i/r_i$ as private/public key counterparts are used for authentication of messages coming from $P_i$ and encryption of messages destined for $P_i$ with ElGamal encryption. When $P_i$ encrypts $m \in Z_q$ for $P_j$, it sends $E_j^k[m] = (m(r_j)^k, g^k)$ where $k \in Z_q$ is a random number and the exponents are computed in $Z_p$. The receiver decrypts by using $m = m(r_j)^k * (g^k)^{-w_j} \pmod{p}$.

The signature operation uses a collision-free hash function $h: N \rightarrow Z_q$. The signature of message m with key $w_i$ where $S_i[h(m)] = (r, s)$ is $r = g^k \pmod{p}$, $s = k^{(-1)}(h(m) - rw_i) \pmod{q}$. This signature can be verified with the public counterpart $r_i = g^{w_i} \pmod{p}$ of $w_i$ by checking the equation $g^{h(m)} ? = r^s r_i^r \pmod{p}$. The hash function h must have a property that knowing m, $S_i[h(m)]$ one cannot produce any pair m', $S_i[h(m')]$ where $m' \neq m$.

All through the update phase, the encryption and authentication is performed with values $w_i^{(t)}$, $r_i^{(t)}$, where t is the round that has just ended. The adversary who comprised a server during this round will know the secret key this server uses to sign and decrypt during the update protocol.

The Full Update Protocol

The following steps detail the update protocol used by the servers in step 314:

At step 410, each server $P_i$ picks (k+1) random numbers $f_{i1}, f_{i2}, \ldots, f_{i(k+1)}$ in $Z_q$ which define an updating polynomial $f_i(Z) = f_{i1}Z^1 + f_{i2}Z^2 + \ldots + f_{i(k+1)}Z^{k+1}$ in $Z_q$ (step 510). It forms (n−1) shares $u_{ij} = f_i(j) \pmod{q}$, $j \neq i$ of this polynomial (step 512), and creates its message $msg_i$:

$$(g^{f_{i1}}, g^{f_{i2}}, \ldots, g^{f_{i(k+1)}}, E_1^{k_{i1}}[u_{i1}], E_2^{k_{i2}}[u_{i2}], \ldots, E_{(i-1)}^{k_{i(i-1)}}[u_{i(i-1)}], E_{(i+1)}^{k_{i(i+1)}}[u_{i(i+1)}], \ldots, E_n^{k_{in}}[u_{in}]) \quad (1)$$

The expression $E_j^{k_{ij}}[u_{ij}]$ represents the El Gamal encryption by the server $P_i$ of the value $u_{ij}$ under the public key $P_j$, using the random value $k_{ij}$ where all exponentials are computed in $Z_p$ (step 514). Additionally, each server $P_i$ picks its new private key $w_i^{(t+1)}$ as a random number in $Z_q$ (step 516), and computes its corresponding new public key: $r_i^{(t+1)} = g^{w_i(t+1)} \pmod{p}$ (step 518). $P_i$ then broadcasts a pair ($msg_i$, $r_i^{(t+1)}$) signed with its old key $w_i^{(t)}$ (steps 412 and 520).

At step 414, each server $P_i$ considers the messages it received in the previous step. If for some j, it received no or more than one authenticated message of the form ($msg_j$, $r_j^{(t+1)}$), it marks $P_j$ as "bad". Let $B_i$ be the set of indexes of servers not marked as "bad". $P_i$ then decrypts the $E_i^{k_{ji}}[u_{ji}]$ parts of messages $msg_j$, $j \in B_i$. Then, for every $j \neq i$, it verifies whether $u_{ji}$ agrees with the coefficients given in the $(g^{f_{j1}}, g^{f_{j2}}, \ldots, g^{f_{j(k+1)}})$ part of the message $msg_j$:

$$g^{u_{ji}} \leftrightarrow (g^{f_{j1}})^i (g^{f_{j2}})^{i^2} \ldots (g^{f_{j(k+1)}})^{i^{(k+1)}} \pmod{p} \quad (2)$$

If this equation does not hold, $P_i$ marks $P_j$ as "bad", removes j from $B_i$ and creates an accusation that it was cheated by $P_j$, $acc_{ij} = (i, j)$. For each server marked "bad", $P_i$ displays corresponding messages to the management on its display showing why it thinks something is wrong with $P_j$. Then, at step 416, the server broadcasts a signed set of all its accusations concatenated with the set of all new public keys $\{r_j\}_{j \in B_i}$ it received in the previous step. The signature is made with the old private key $w_i^{(t)}$.

At step 418, each server $P_i$ verifies signatures on the messages broadcasted in the previous step. If more than one message is broadcasted with the same signature, the corresponding server is marked "bad", set $B_i$ is reduced and the proper messages for the management are displayed on $P_i$'s console. Servers display the set of pairs (j,l) on their consoles such that a new public key $r_1^{(t+1)}$ was not acknowledged by $P_j$.

This lets the management trace where the active link attacks are. However, the lack of acknowledgements for new public keys does not influence $B_i$. For each accusation $acc_{ji}$ by some server $P_j$, $j \in B_i$, server $P_i$ broadcasts a signed response containing the share and the random vector used in communication with $P_j$: $resp_{ij} = (i, j, k_{ij}, u_{ij})$, so that to allow for a public trial to determine who was cheating. These responses should be concatenated and broadcasted with one signature. At step 420, if more than one response was broadcasted with the signature of the same server, every server P marks it as "bad", reduces its set $B_i$ and displays messages for the management. Each server P makes its own decision for every pair of ($acc_{ji}$, $resp_{ij}$) that were properly broadcasted by $P_i$ in step (1). The values sent in $resp_{ij}$ are treated with suspicion, so they are denoted with "primes": $k'_{ij}$, $u'_{ij}$.

Every server P decides according to the following algorithm:

(a) If $E_j^{k'_{ij}}[u'_{ij}] \neq (u'_{ij}(r_j^{(t)})^{k'_{ij}} \pmod{p}, g^{k'_{ij}} \pmod{p})$, or when $P_i$ did not respond to $P_j$'s accusation at all, then $P_i$ is cheating and so it must be marked as "bad". Otherwise:

(b) If $(u'_{ij}, k'_{ij})$ are indeed the values that were used in $msg_i$, then check whether $u'_{ij} = u_{ij}$ is the proper share of polynomial $f_i$, by evaluating the same equation (2) as should be used by $P_j$ in step (2). If the equation does not agree, then it is a proof that $P_i$ sent a bad share to $P_j$ and so it must be marked as "bad". If the equation is correct, then P marks $P_j$ as "bad".

For each server marked "bad", set $B_i$ is reduced and corresponding messages on $P_i$'s console are displayed.

At step 422, each server $P_i$ computes:

$$x_i^{(t+1)} \leftarrow x_i^{(t)} + \sum_{k \in B_i} f_k(i) \pmod{q}$$

$$\forall_{j \neq i} \, y_j^{(t+1)} \leftarrow y_j^{(t)} * \prod_{k \in B_i} g^{f_k(j)} \pmod{p}$$

Also, each server deletes all the variables used in this protocol, except of new share $x_i^{(t+1)}$, new key $w_i^{(t+1)}$, set $\{y_j^{(t+1)}\}_{j \in \{1,n\}}$ and set $\{r_j^{(t+1)}\}_{j \in \{1,n\}}$ of new public keys.

The proper update polynomial $\delta(.)$ is equal to the sum $\Sigma_{k \in B} f_k(.) \pmod{q}$, where $B = B_i$ (in step 420) for at least (k+2) servers $P_i$, $i \in \{1, n\}$.

Whenever a server P is expecting to receive a signed broadcast of a message of a known format and it receives two such messages, both seemingly coming from the same server $P_i$, then P marks $P_i$ as faulty. Of course, the attacker could always send the same message that $P_i$ did. In this protocol, every server sends up to three messages. Therefore, whenever P gets a set $C_i$ of messages seemingly signed by $P_i$, it should throw away those elements of $C_i$ that were broadcasted by $P_i$ in some previous step of the protocol, and then if all other elements of $C_i$ are the same, take this element as $P_i$'s message. Otherwise, mark $P_i$ as "bad", because it is either cheating or it is duplicated by the adversary who compromised its authentication key. Another fine point is that if $P_i$ sees some messages signed seemingly by itself, it also marks itself as "bad" and computes $B_i$ accordingly. This way, even though it is duplicated, it will compute its new share $x_i^{(t+1)}$ and all $\{y_j^{(t+1)}\}_{j\in\{1,n\}}$ correctly. Its new public authentication and encryption key $r_i^{(t+1)}$ is not acknowledged though, and must still be taken care of.

Analysis of the Update Protocol

The adversary can interfere with the above protocol in three ways:

- It can make the server it controls cheat in this protocol. A disabled server will look like it is cheating or like it is sending random messages (if it encrypts and signs messages with the wrong keys).
- It can send messages signed with the keys of the server it compromised during the round before this update phase. For the other servers, this case is indistinguishable from the case when the server is still controlled by the adversary.
- It can attack a link between a server and a communication channel.

Since at every update round there are (k+2) servers who are honest, who were not compromised in the previous round and whose link to the communication channel is not under active attack, these servers' sets $B_i$ will all be the same and will have at least (k+2) elements. Therefore, the secret-sharing polynomial f will be updated with at least (k+2) polynomials $f_i$, none of which can be reconstructed by the adversary. In the worst case, the adversary can learn k shares of each of these polynomials, but since they are all of the degree (k+1) and $f_i(0)=0$ for each of them, one needs (k+1) shares to reconstruct them.

Recovery After Update

From the messages displayed on the servers' consoles, the management can decide which machines are controlled, compromised or disabled and which links were under active attack by the adversary. In particular, the consoles will display information on two (often intersecting) sets of servers:

Those who didn't receive some acknowledgements of their new public keys.

Those whose new public keys are not acknowledged by at least (k+2) servers, whose secret shares $x_i^{(t+1)}$ are badly computed and inconsistent with the new polynomial $f^{(t+2)}$.

Also, their view of the current set $\{Y_j^{(t+1)}\}_{j\in\{1,n\}}$ is not correct.

The first set gives the management information about the active link attacks. The managers then promptly remove the adversary from the deduced links. With regard to the second set, the managers first perform a key reinstallation procedure (step 316) and then trigger an automatic share recovery protocol (step 318). Let C be the set of servers in A whose public keys $\{r_j\}$ are well-distributed and acknowledged by other servers. Then $|C|\geq k+2$.

The reinstallation of $P_i$'s key (step 316) is as follows: Through $P_i$'s console, the managers install the set $\{r_j\}_{j\in C}$ and then ask $P_i$ to pick its new random private key $w_i\in Z_q$. $P_i$ picks such a number and displays the corresponding public key $r_i=g^{w_i}$ (mod p). The managers then install this number in all other servers. Set C is augmented by $P_i$. When this reinstallation is finished, the managers trigger the recovery protocol on servers C. Alternatively, the servers themselves are programmed so that whenever some public key is reinstalled in them they start an agreement protocol to trigger the recovery protocol automatically, when all the servers in the C are ready.

Share Recovery Protocol

Figure 6A:
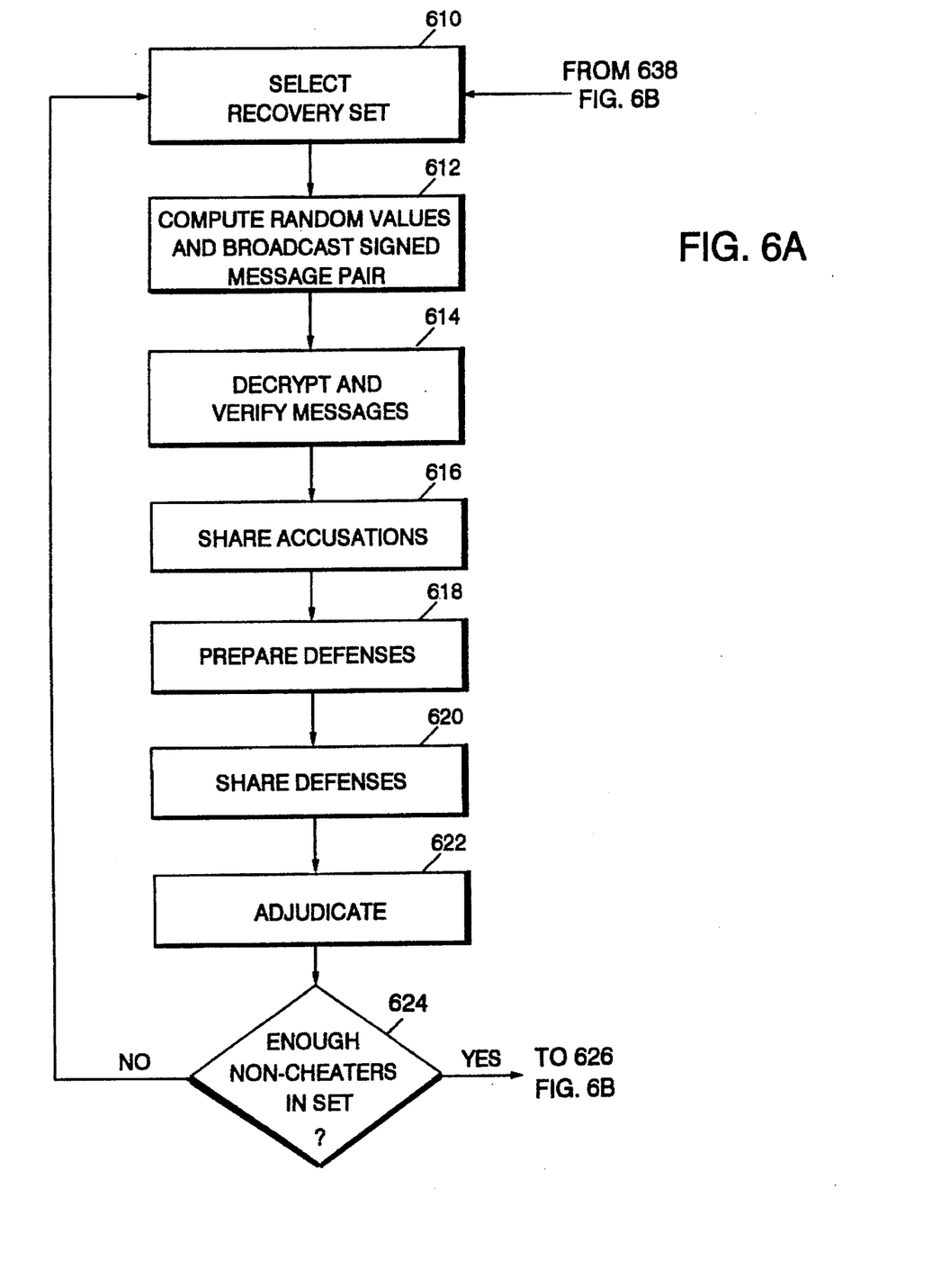
FIGS. 6a and 6b comprise a flow chart showing the sequence of steps of a preferred embodiment of the share recovery protocol of the present invention.

Let $P_u$ denote the server who's share $x_u=f(u)$ needs to be reinstalled. At first, step 610, the servers choose an initial set $B \subset C\setminus\{P_u\}$ of (k+2) servers where "\" represents the set difference operation wherein $C\setminus\{P_u\}$ is a set which includes the element of set C not included in the elements of set $P_u$. They are picked from C because they must be able to authenticate q themselves to $P_u$ and vice-versa. This is easy since servers are ordered by indexes and they know the current state of C, i.e., servers who have working authentication and encryption keys. The protocol must have the following properties in the presence of the adversary:

$P_u$ learns only $x_u$, i.e., it can't learn any other share $x_i$ where i∈B.

No (k−1) group $F \subset A\setminus\{P_u\}$ of servers can learn $x_u$ or any $x_i$, where i∈A\F.

Server $P_u$ learns the proper set $\{y_i\}_{i\in\{1,n\}}$.

The basic set of (k+2) servers with valid shares off, can recover not only x=f(0) (mod q) but any other value of f, in particular the share $x_u=f(uv)$ (mod q) that $P_u$ needs. This can be done with the Lagrange interpolation formula. After set B of (k+2) servers that are supposed to cooperate is established, each $P_i$, i∈B sends $$a_i = x_i \pi_{j\in B, j\neq i} \frac{u-j}{i-j} \pmod{q} \text{ to } P_u.$$

Then $P_u$ adds them together to get $x_u=f(u)=\Sigma_{i\in B}a_i$. However, if the present invention only did that, $P_u$ would also learn all $x_i$'s from $a_i$'s. But the present invention can treat $a_i$s as trivial secret shares of $x_u$. So the present invention requires servers in B to rerandomize these shares before sending them to $P_u$: Each server $P_i$ in B picks (k+2) random numbers $\{c_{ij}\}_{j\in B}$. Then they exchange these values pairwise: $P_i$ gives $c_{ij}$ to $P_j$ and gets $c_{ij}$. And then each sends $a_i'=a_i+\Sigma_{j\in B}c_{ji}-\Sigma_{j\in B}c_{ji}$ (mod q) to $P_u$. Notice that $\Sigma_{i\in B}a_i'=x_u$ (mod q), so this is another secret sharing of $x_u$. Now the basic scheme must be made verifiable using the same tools used in the update phase protocol.

Given below is the full protocol for making the scheme verifiable. Notice that all broadcasts involve servers in C including the ones that are not currently in set B and the server $P_u$. For clarity, the below does not mention that for every authenticated broadcast, the recipients check the signature on the message and when there is a duplication attack (because the sender is cheating or its keys are compromised and duplicated), they mark this server as "bad" and display adequate messages on their consoles for the management. This is the same procedure as in the update protocol. The protocol for making the scheme verifiable is:

all $P_i$'s in B compute k+2 random values $\{c_{ij}\}_{j\in B}$ in $Z_q$ each, and broadcast:

$$(\{g^{c_{ij}} \pmod p\}_{j\in B}, \{E_j^{k_{ij}}[C_{ij}]\}_{j\in B}) \tag{3}$$

and a signature of this message (step 612).

At step 614, all $P_i$'s in B decrypt values $\{c_{ji}\}_{j \in B}$ from the above broadcasts and verify whether they were given right shares from every server $P_j$, by taking the exponent $g^{c_{ji}}$ broadcast by $P_j$ in the same message. If this value does not agree, $P_i$ broadcasts an accusation $acc_{ij}=(i, j, S_i[i, j])$ of $P_j$ to all servers (step 616). It also marks $P_j$ as a "bad" server.

At step 618, just like in the update protocol, for each accusation $acc_{ji}$ by some server $P_j$, server $P_i$ verifies the signature $S_i[j, i]$, and if this proves that the originator of the accusation knows x, then $P_i$ responds by broadcasting $c_{ij}$ and the random vector used in communication with $P_j$: $resp_{ij}=(i, j, k_{ij}, c_{ij})$, so as to allow for a public trial to determine who was cheating (step 620).

At step 622, every server P (not only the ones in B), for all pairs $acc_{ji}$, $resp_{ij}$ broadcasted in the two previous steps, verifies whether these are the true values used in the communication between $P_i$ and $P_j$, and if they are, checks whether the exponent $g^{c_{ji}}$ (mod p) of the sent value agrees with the exponent broadcasted by $P_i$ in the set $\{g^{c_{ji}}(\mathrm{mod}\ p)\}_{j \in B}$. This step is equivalent to the verification in step 420 of the update protocol. Either $P_i$ or $P_j$ will turn out to be cheaters and will be adequately marked as "bad" by P.

At step 624, every server considers its local set $F_i$ of servers it marked as "bad" in the previous step. If $|F_i|=m \neq 0$, they compute new B: $B \leftarrow (B \backslash F) \cup \{\max(B)+1, \ldots, \max(B)+m\}$. Due to broadcasts, all honest and active servers will have the same view of F and hence the same view of the new B. After they recompute the B, they start the protocol again from step 610.

At step 626, if nobody cheated in the previous step, every server $P_i$ computes its subshare:

$$a_i' = a_i + \sum_{j \in B} c_{ij} - \sum_{j \in B} c_{ji} \pmod{q} \qquad (4)$$

Figure 6B:
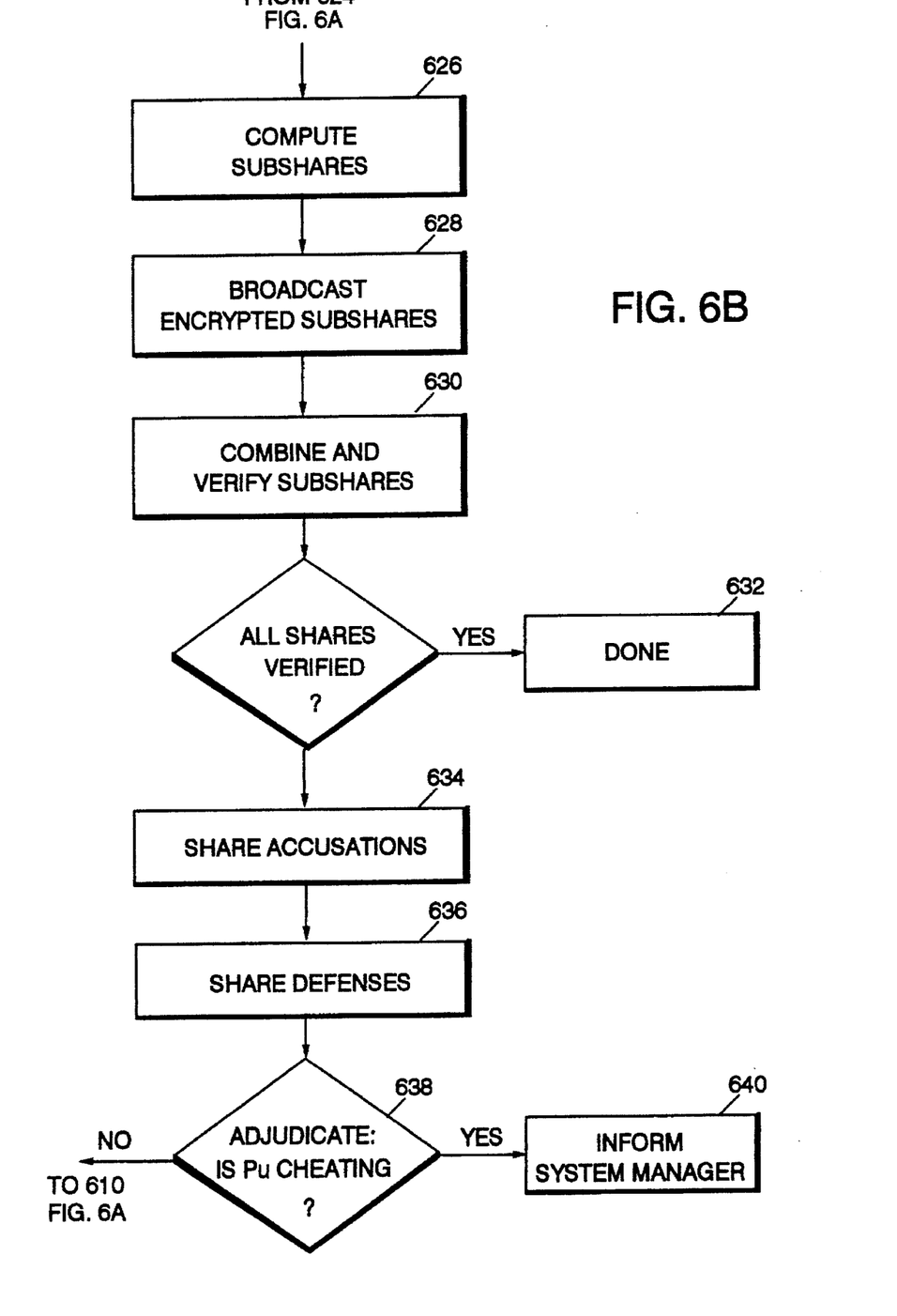

At step 628, each server $P_i$ in B broadcasts $E_{r_u}{}^{k_i}[a_i']$ to all servers where $k_i$ is a random number in $Z_q$.

At step 630, $P_u$ decrypts all $\{a_i'\}_{i \in B}$ from these broadcasts and computes $x_u = \Sigma_{i \in B} a_i' \pmod{q}$. Then it checks whether the exponent $g^{x_u}$ (mod p) of this value is the same as the public key $y_u$ that was installed at $P_u$ initially. If it is, the reconstruction ends at step 632. If not, some server from B must have cheated. P finds the cheaters by evaluating for every $i \in B$:

$$g^{a_i} \leftarrow (y_i) \pi_{j \in B, j \neq 1} \frac{u-j}{i-j} \pmod{p}$$

$$g^{a_i} \stackrel{?}{=} g^{a_i} * \pi_{j \in B} g^{c_{ij}} * \left( \pi_{j \in B}\ g^{c_{ji}} \right)^{(-1)} \pmod{p}$$

where the values $\{g^{c_{ij}}\}_{i,j \in B}$ are taken from broadcasts in step 612. If the second formula does not hold, it means that $P_i$ did not send the proper $a_i'$ to $P_u$. To prove it to others, $P_u$ broadcasts its accusation $acc_i=(i, S_{u,temp}[i])$ to all other servers (step 634). Also, it itself marks all the cheaters as a "bad" set F.

At step 636, like in step 618 of this protocol, every accused server $P_i$ verifies the signature on the accusation $acc_i$ and if it is valid, it broadcasts response $resp_i=(i, k_i, a_i')$.

At step 638, every server P checks all these accusations by first checking that these are the values used in the communication and then checking the same verification equations as $P_u$ performed above. Again, they will all arrive at the same set F of servers they detected to be faulty. If it turns out that it is $P_u$ who is cheating, then they will all send adequate messages to the system managers and the recovery procedure will be stopped (step 640). This event would mean that $P_u$ is again controlled by the adversary. This is just like any other adversary detection: The system managers will read the warnings displayed by the servers and restart the whole recovery process. If however, $P_u$'s accusations are correct then, as usual, the servers display proper warnings for the system management and continue the recovery by recomputing the set B: $B \leftarrow (B \backslash F) \cup \{\max(B)+1, \ldots, \max(B)+m\}$, where $|F|=m$, and restarting the whole protocol from step 610.

Security of the Update Protocol in the Presence of Controlled Servers

Securing the above protocol in the presence of k cheating servers and no attacks on the links can be reduced to verifiable secret sharing. Namely, the solution is a mechanism with which the honest servers $P_j$ will be able to detect if any particular server $P_i$ was cheating in the protocol. In this case, they will unanimously mark its shares of updating polynomial $f_i$ as "bad". $P_i$ cheats in the above protocol if and only if the values that it sends to other servers in step 612 are not proper values of any k degree polynomial f over $Z_q$ such that $f(0)=0 \pmod{q}$. This is a somewhat simplified case of verifiable secret sharing, which is called verified sharing of a value, because every server P distributes a known value zero among (n−1) other servers (it also gives one share to itself). Just like in verifiable secret sharing, honest servers should unanimously agree whether the "secret" value zero was properly shared by P. Also, just like in verifiable secret sharing, it should be achieved in such a way that each server learns only its own secret share.

The modified steps 618–620 of the update protocol from above would be: $x_i^{(t+1)} \leftarrow x_i^{(t)} + \Sigma_{k \in B_i} f_k(i) \pmod{q}$ where $B_i$ is the set of indexes of all servers whose update polynomials were not marked as "bad" by $P_i$. With verifiable secret sharing mechanism, if $P_i$ and $P_j$ are both honest during the update phase, then $B_i=B_j$, i.e., they will have the same judgment about the honesty of other servers.

Existing protocols for verifiable secret sharing all require a broadcast channel. Therefore, from this point, assume that each of the n secret-sharing servers has a link that connects it to a common broadcast channel like ethernet. Every message that gets onto this broadcast channel gets to all links connecting this channel to the servers.

If verifiable secret sharing in the presence of up to k cheating, disabled or frozen servers during the update is achieved, there will be at least n−k updating polynomials $f_i$ with which every honest server will update its shares.

This degree of re-randomization of shares is enough to ensure the second property of the proactive scheme, namely that knowing k shares before the update and k shares after does not let the adversary reconstruct the secret. The fine point is when k servers are controlled during the update: The adversary will then know k shares of each updating polynomial $f_i$, and this will allow her to reconstruct all of them, because the free coefficient of them all is known to be zero. Hence, she can compute the total updating value $\delta(i)=(f_1(i)+f_2(i)+\ldots+f_n(i)) \pmod{q}$ of every server $P_i$. However, if the adversary compromises a set F of k servers during the update phase, she can not compromise any other servers in either the round before or after this update. Hence she knows all $\{x_i^{(t)}\}_{i \in F}$ and $\{\delta(i)\}_{i \in \{1,n\}}$ which in particular allows her to compute $\{x_i^{(t+1)}\}_{i \in F}$, which she knows anyway. But she still cannot learn any additional share $x_i^{(t)}$, $J \notin F$ or $x_i^{(t+1)}$, $j \notin F$, which would allow her to reconstruct the secret.

Security of the Update Protocol in the Presence of "Duplication" Attacks and Link Attacks If the adversary compromises server A in round t and leaves it in the same round, then during the update phase between rounds t and (t+1) this server will not be faulty, but the adversary will know all its secrets. First an adversary who can only compromise servers (i.e., no active disruption of the protocol is assumed). Let F be the set of servers compromised by the adversary during round t and during the update t/(t+1). In the worst case, $|F|=(k-1)$. Let G be a set of "good" servers, who are absolutely secure against the adversary both in the round and during the update. Obviously, each $f_n$, i∈F will be known to the adversary, because it controls servers F. Also, the adversary will learn the (k−1) shares of each $f_i$, i∈G that they will send to servers F. Now, depending on the protocol, it may or may not learn the shares of $f_i$, i∈G that A gets. If servers send the shares of their updating polynomials just encrypted under the key known to A, then the adversary can learn them.

Proactively Secure Public Key Certification Authority

Presented is a complete solution showing how to apply proactive secret sharing to implement a proactively secure Key Certification Authority center. Described is a system that performs an ElGamal signature operation of messages and maintains its signature key proactively. Such a system can be effectively used as a key certification authority, because the messages it signs could be in public keys and identification tags of other users.

Distributed Version of ElGamal Signature

At first, assume a distributed version of the ElGamal signature algorithm, in which a signature operation is performed by a group of participating servers, who form a signature center together. The signature is composed of the partial signatures of these servers. It can be checked with a single public verification key. This means that, conceptually, there is also a single signature key, only that it is shared among the servers forming the signature center. The algorithm allows a change in the distribution of this secret key among the servers that share it, i.e., it allows proactive update of shares.

Initialization

Let p be a large prime number and g a random number smaller than p. Both p and g are known by all the parties in the network. Each server $P_i$ takes as its private key a random number $x_i$, where i∈{0,n} and $x_i<p-1$. After the private keys of all the servers are initialized, it is required that in every consequent round, the sum $x_1^{(t)}+x_2^{(t)}+\ldots+x_n^{(t)}=x \pmod q$, where $x_i^{(t)}$ stands for a private key of the server $P_i$ at round t and x stand for a conceptual constant secret key of the signature center. Initially, each server computes the public counterpart of its private key: $y_i=g^{x_i} \pmod p$. Then they send out their parts of a public key to one another, so that the public verification counterpart of x can be computed:

$$y = y_1 y_2 \ldots y_n = g^{x_1} g^{x_2} \ldots g^{x_n} = g^{x_1+x_2+\ldots+x_n} \pmod p \qquad (5)$$

The sequence (p, g, y, n) is a public key used for verification of the signatures produced by this signature center.

Issuing of a Signature

To sign message m, each server picks its own secret random number $k_i$, relative prime to (p−1). Then each server $P_i$ computes the first part of its signature: $r_i=g^{k_i} \pmod p$. Each server broadcasts its $r_i$ to other servers, so that each of them can compute a second part of its signature:

$$s_i = k_i^{-1}(m - x_i r_1 r_2 \ldots r_n) \pmod{p-1} \qquad (6)$$

The value of $k_i^{-1} \pmod{p-1}$ can be found by the Euclidean algorithm, just like in the original ElGamal signature scheme. The signed message is a following sequence:

$$S(m) = (m, s_1, s_2, \ldots, s_n, r_1, r_2, \ldots, r_n) \qquad (7)$$

Verification of a Signature

The party that needs to verify the signature checks whether the following is true:

$$g^m = y^{r_1 r_2 \ldots r_n} r_1^{s_1} r_2^{s_2} \ldots r_n^{s_n} \pmod p \qquad (8)$$

We can show that this is true by the following transformations:

$$y^{r_1 \ldots r_n} r_1^{s_1} \ldots r_n^{s_n} = (g^{x_1+\ldots+x_n})^{r_1 \ldots r_n} (g^{k_1})^{k_1^{-1}(m-x_1 r_1 \ldots r_n)} \ldots (g^{k_n})^{k_n^{-1}(m-x_n r_1 \ldots r_n)} = g^{x_1 r_1 \ldots r_n + \ldots + x_n r_1 \ldots r_n} \cdot g^{m-x_1 r_1 r_2 \ldots r_n} \ldots g^{m-x_n r_1 \ldots r_n} = g^{n*m} \pmod p$$

Security Analysis

The security of the above basic distributed ElGamal algorithm, as well as the rest of the present protocol, relies on the assumption that computing logarithms in the final field of big prime order is computationally infeasible in probabilistic polynomial time. This is the fundamental security assumption of the ElGamal and DSA encryption and signature schemes. The above distributed version of ElGamal public key algorithm is just as secure as the original version. If the attacker can break the present invention's algorithm, she would be able to break the regular ElGamal as well. Assume that the attacker knows m, S(m) and $x_1, x_2, \ldots, x_{n-1}$. What she still needs is $x_n$. She can compute $g^{x_n} = y * g^{-(x_1+x_2+\ldots+x_{n-1})}$, where negative exponent is computed modulo (p−1). We substitute $x = x_n s_n, k = k_n r_1 r_2 \ldots r_n$. Then the attacker knows: $g^x = (g^{x_n})^{s_n} \pmod p$, $g^k = (g^{k_n})^{r_1 r_2 \ldots r_n} \pmod p$ and $x+1 = s_n k_n + x_n r_1 r_2 \ldots r_n = m \pmod{p-1}$. In this set of three equations, one of the first two can be derived from the rest. For example, $g^k = g^{x+k}(g^x)^{(-1)} \pmod{p-1}$. So, left are the following two equations, where a, b are known and x, k are unknown:

$$g^x = a \pmod p \quad x+k=b \pmod{p-1}$$

The security of the original ElGamal algorithm is based on the fact that the second equation does not give out any information about x, if k is unknown, and hence, ElGamal is as secure as it is computationally infeasible to compute a logarithm $x=\log_g a \pmod p$ in probabilistic polynomial time.

Adapting the Distributed ElGamal to Proactive Threshold Secret Sharing Scheme

The present invention incorporates Shamir polynomial secret-sharing to the above distributed ElGamal. This incorporation creates a threshold proactive scheme, but the threshold is only during the round. As noted before, threshold during the update phase requires recovery mechanism. This scheme does not achieve robustness. Hence, this preliminary scheme is secure against an adversary who:

Can compromise up to k servers in each round.

Can freeze up to k servers during the round, but not during an update phase.

The present invention is related to the Desmedt and Frankel solution of threshold secret-sharing in the exponent, described in Threshold Cryptosystems, Crypto 89, pp. 307–15. Their idea was to use Shamir threshold secret-sharing by polynomial of degree k and then compute the exponent of the secret with a group of (k+2) honest servers by computing components of Lagrange interpolation formula locally at each server. The similarity between their scheme and the present invention is that both use Lagrange reconstruction of a secret shared with a polynomial, but nobody can learn the reconstruction secret in the process. The secret is only used to either exponentiate a message (in the case of Desmedt and Frankel) or issue an ElGamal-derived signature (in the present invention). The present invention uses k degree polynomial function f to secret-share f(0)=x among n servers. It picks p and the element $g \in Z_p$ so that g is of prime order q, i.e., $g^q = 1 \pmod p$. Q should be as big as possible, so that $p = mq+1$, $m \in \{2,3,4\}$. The public key becomes now a sequence (p, q, g, y, k).

The present invention assumes that during a safe initialization stage, each server gets its secret share of x, $x_i = f(i)$, where f is computed in $Z_q$. To issue a signature, the servers agree on a group B of any (k+2) active servers that will participate in signing. The other servers are idle. Knowing set B, each server $P_i$, $i \in B$ computes:

$$a_i = x_i * \prod_{j \in B, j \neq i} \frac{0-j}{i-j} \pmod{q} \quad (9)$$

From the Lagrange interpolation formula, this ensures that $$\sum_{i \in B} a_i = x \pmod{q} \quad (10)$$

because $\forall_i$, $x_i = f(i)$, $x = f(0)$ and f is a k degree polynomial in $Z_q$. The existence of inverses of (i-j), $i \neq j$ is ensured by the fact that q is prime. Using $a_i$'s as their partial secrets, servers in B issue their partial signatures $(r_i, s_i)$, $i \in B$ following the basic proactive protocol from above:

$$s_i = k_i^{-1} * \left( m - a_i \prod_{j \in B} r_j \right) \pmod{q}$$

$$S(m) = (m, \{(r_i, s_i)\}_{i \in B})$$

The verification formula becomes:

$$g^{(k+2)*m} = y \prod_{(r_i, s_i) \in S(m)} r_i \prod_{(r_i, s_i) \in S(m)} r_i^{s_i} \pmod{p} \quad (11)$$

Verification and Robustness in Signing Protocol

The first property that must be added to the above preliminary threshold scheme is robustness during the round. This will make it secure against an adversary who can control up to k servers, but still only during the round, not during an update phase. The above threshold scheme is signers-dependent, because it is essential that before issuing the signature, honest servers agree on the (k+2) element set B of servers that will cooperate to sign the message. To be able to pick set B of some currently active, honest servers, a mechanism with which honest servers can filter out cheaters is needed. Formally, each server, knowing B, m and S(m), should be able to verify for every server $P_i$, $i \in B$, whether its partial signature $(r_i, s_i) \in S(m)$ is correct, in the sense of being computed according to the protocol with the same m, g, p, q and the proper secret key $a_i$ computed according to equation (5).

To enable this mutual partial verification between the servers, the present invention treats secret shares $x_i^{(t)}$ of each server as their private signature keys and gives all other servers the public verification counterpart to these keys: $y_i^{(t)} = g^{x_i(t)} \pmod{p}$. Every honest processor P (not only those that are currently in B) verifies a partial signature $(r_i, s_i) \in S(m)$ of every server $P_i$ in B in the following two steps:

1. Knowing current B and $Y_i = g^{x_i} \pmod{p}$, P computes $$g^{a_i} = (y_i)^{\pi_{j \in B, j \neq i} \frac{0-j}{i-j} \pmod{q}} \pmod{p}.$$

Having computed $g^{a_i}$ as above, P takes S(m) and verifies $P_i$'s signature by the equation:

In this way, all honest servers can determine set $F \subseteq B$ of faulty servers that cheated while issuing the signature S(m). Since the servers are ordered by their indices $i \in \{1, n\}$, it is trivial for honest servers to update set B to filter out the detected cheaters and try a new set of active servers. For example, at the beginning of every round they start with B=1, 2, ..., k+2 and every time they sign and detect a set of m>0 cheaters $F = \{i_1, i_2, \ldots i_m\}$, they take $$B \leftarrow (B \setminus F) \cup \{\max(B)+1, \ldots, \max(B)+m\} \quad (13)$$

Since the present invention assumes that at every round, up to k servers can be taken over by the adversary and thus can be cheating, the following update will be performed no more than k times (in the case when the cheaters come out "one by one"). This is equivalent to issuing up to k extra signatures every round. This is a negligible overhead.

The update protocol from above can be extended to ensure maintenance of public counterparts $y_i^{(t)}$, of secret shares $x_i^{(t)}$ for every round t. In step (2), when server $P_i$ sends $f_i(j)$ to $P_j$, it also sends $g^{f_i(j)}$ to all other servers. This will allow all the servers to compute the public key for all i:

$$y_i^{(t+1)} \leftarrow y_i^{(t)} * (g^{f_1(i)} g^{f_2(i)} \cdots g^{f_n(i)}) \pmod{p} \quad (14)$$

Assuming "hardness" of computing logarithms in $Z_p$, broadcasting $g^{f_i(j)}$ does not help the adversary.

Although the present invention and its advantages have been described in detail, it should be understood that various changes, substitutions and alterations can be made herein without departing from the spirit and scope of the invention as defined by the appended claims.

What is claimed is:

1. A method of public key cryptography having proactive, robust and recoverable distributed threshold secret sharing, comprising the steps of:

initializing servers linked by a communications network to form keys;

synchronizing said servers to operate in discrete rounds having ends;

calculating updated keys at said ends of said rounds from messages broadcast on said communications network;

verifying said updated keys to form a set of compromised servers;

recovering said set of compromised servers; and wherein said step of calculating updated keys at said ends of said rounds from messages broadcast on said communications network comprises the steps of:

picking a set of random numbers for each said server;

picking a new key for each said server, said new key derived from said set of random numbers; and broadcasting messages derived from said set of random numbers on said communication network.

2. The method of claim 1, wherein said initializing servers linked by a communications network to form keys comprises the steps of:

choosing random numbers for each said server;

calculating secret values for each said server from said random numbers;

calculating private keys for each said server from said secret values; and broadcasting public counterparts of said private keys on said communications network.

3. The method of claim 1, wherein said verifying said updated keys to form a set of compromised servers comprises the steps of:

analyzing said messages broadcast on said communications network to form a set of bad servers;

creating a set of accusations corresponding to said set of bad servers;

broadcasting said set of accusations on said communications network; and analyzing said broadcasted set of accusations to form an updated set of bad servers.

4. The method of claim 1, further comprising the step of displaying messages identifying said set of compromised servers on a console.

5. The method of claim 1, wherein said recovering said set of compromised servers comprises the steps of:
   installing a new private key in each server in said set of compromised servers;
   choosing a set of recovery servers from said servers;
   computing sub-shares for each server in said set of recovery servers;
   broadcasting messages derived from said sub-shares on said communications network; and
   verifying said messages derived from said sub-shares received by said set of compromised servers.

6. The method of claim 5, wherein said choosing a set of recovery servers comprises:
   choosing a subset of said servers;
   computing a set of random values for each server in said subset;
   broadcasting signed messages derived from said set of random values on said communications network;
   verifying said signed messages to derive a set of bad servers; and
   eliminating said set of bad servers from said subset of said servers.

7. The method of claim 1, further comprising the steps of:
   picking random numbers for each said server;
   computing first parts of signatures for each said server from said random numbers;
   broadcasting said first parts of signatures on said communications network; and
   computing second parts of signatures for each said server from said first parts of signatures.

8. The method of claim 7, further comprising the step of verifying a message signed with said second parts of signatures.

9. A data processing system for processing a public key cryptography scheme having proactive, robust and recoverable distributed threshold secret sharing, comprising:
   servers linked by a communications network;
   initialization means for initializing said servers to form keys associated with said servers;
   timing means for synchronizing operation of said servers into discrete rounds having ends;
   updating means for updating said keys at the end of each round of said discrete rounds to produce updated keys;
   verification means for verifying said updated keys to form a set of compromised servers;
   recovery means for recovering said set of compromised servers; and
   wherein said updating means for updating said keys at the end of each round of said discrete rounds to produce updated keys comprises:
      random number generating means for generating a set of random numbers, said set of random numbers with each said server;
      key generating means for generating a new key for each said server from said set of random numbers; and
      broadcasting means for broadcasting a message on said communications network derived from said set of random numbers.

10. The data processing system of claim 9, wherein said initialization means comprises:
    choosing means for choosing a random number for each said server;
    first calculating means for calculating a secret value for each said server from said random number;
    second calculating means for calculating a private key and a public counterpart of said private key for each said server from said secret value;
    broadcasting means for broadcasting said public counterpart of each said private key on said communications network.

11. The data processing system of claim 9, wherein said verification means for verifying said updated keys to form a set of compromised servers comprises:
    first analysis means for analyzing messages broadcast on said communications network to form a set of bad servers;
    accusation means for creating a set of accusations corresponding to said set of bad servers;
    broadcasting means for broadcasting said set of accusations on said communications network;
    second analysis means for analyzing said broadcasted set of accusations to form an updated set of bad servers.

12. The data processing system of claim 9, further comprising display means for displaying said set of compromised servers.

13. The data processing system of claim 9, wherein said recovery means for recovering said set of compromised servers comprises:
    selecting means for selecting a set of recovery servers from said servers;
    computing means for computing a sub-share for each server in said set of recovery servers;
    broadcasting means for broadcasting messages derived from said sub-share from each server in said set of recovery servers on said communications network; and
    verification means for verifying said messages derived from each said sub-share received by said set of compromised servers.

14. The data processing system of claim 13, wherein said selecting means for selecting a set of recovery servers comprises:
    choosing means for choosing a subset of said servers;
    computing means for computing a set of random values for each server in said subset;
    broadcasting means for broadcasting signed messages derived from said set of random values on said communications network;
    verification means for verifying said signed messages to derive a set of bad servers; and
    elimination means for eliminating said set of bad servers from said subset.

15. The data processing system of claim 9, further comprising:
    random number generation means for generating a set of random numbers for each said server;
    first computing means for computing first parts of signatures for each said server from said set of random numbers;
    broadcasting means for broadcasting said first parts of signatures on said communications network; and
    second computing means for computing second parts of signatures for each said server from said first parts of signatures.

16. The data processing of claim 15, further comprising verification means for verifying a message signed with said second parts of signatures.

* * * * *

UNITED STATES PATENT AND TRADEMARK OFFICE
CERTIFICATE OF CORRECTION

PATENT NO. : 5,625,692

DATED : April 29, 1997

INVENTOR(S) : AMIR HERZBERG et al

It is certified that error appears in the above-indentified patent and that said Letters Patent is hereby corrected as shown below:

| | |
|---|---|
| Column 8, line 65 | Insert "3." before --$P_i$ computes..." |
| Column 9, line 5 | Delete "variable" and Replace it with --verifiable-- |
| Column 12, line 30 | Delete "off" and Replace it with -- of $f$ -- |
| Column 13, line 45-50 | Replace the formulas with the following: $$g^{a_i} \leftarrow (y_i) \prod_{j \in B, j \neq i} \frac{u-j}{i-j} \ (mod\ p)$$ $$g^{a_i} \stackrel{?}{=} g^{a_i} * \prod_{j \in B} g^{c_{ij}} * (\prod_{j \in B} g^{c_{ji}})^{(-1)} \ (mod\ p)$$ |
| Column 17, line 20 | After "from above:" Insert $r_i = g^{k}{}_i \ (mod\ p)$ |
| Column 17, line 59 | Before "Having computed" Insert --2.-- |

UNITED STATES PATENT AND TRADEMARK OFFICE
CERTIFICATE OF CORRECTION

PATENT NO. : 5,625,692

DATED : April 29, 1997

INVENTOR(S) : AMIR HERZBERG et al

It is certified that error appears in the above-indentified patent and that said Letters Patent is hereby corrected as shown below:

Column 17, line 61     Insert the following equation (12) in its entirety:

$$g^m = (g^{a_i})^{\prod_{(r_j, s_j) \in S(m)} r_j} * r_i^{s_i} = g^{a_i \prod_{(r_j, s_j) \in S(m)} r_j} (g^{k_i})^{k_i^{(-1)} * (m - a_i \prod_{(r_j, s_m) \in S(m)} r_j)} \pmod{p}$$

(12)

Signed and Sealed this

Thirtieth Day of December, 1997

Attest:

BRUCE LEHMAN

*Attesting Officer*     *Commissioner of Patents and Trademarks*